United States Patent [19]
Ward et al.

[11] Patent Number: 5,974,320
[45] Date of Patent: Oct. 26, 1999

[54] PROVIDING A NEIGHBORHOOD ZONE WITHIN A MOBILE TELECOMMUNICATIONS NETWORK

[75] Inventors: Torbjorn Ward, Cary, N.C.; Anders Sandell, Quebéc; Daniel Dufour, Blainville, both of Canada

[73] Assignee: Telefonaktiebolaget LM Ericsson (publ), Stockholm, Sweden

[21] Appl. No.: 08/861,270

[22] Filed: May 21, 1997

[51] Int. Cl.$^6$ ........................................ H04Q 7/00
[52] U.S. Cl. .................... 455/437; 455/432; 455/434
[58] Field of Search .................... 455/432, 434, 455/440, 515, 525, 436, 437, 438, 439, 443

[56] References Cited

U.S. PATENT DOCUMENTS

| | | | |
|---|---|---|---|
| 5,117,502 | 5/1992 | Onoda et al. ........................ | 455/33.1 |
| 5,295,180 | 3/1994 | Vendetti et al. ........................ | 379/59 |
| 5,325,419 | 6/1994 | Connolly et al. ........................ | 379/60 |
| 5,327,575 | 7/1994 | Menich et al. ........................ | 455/437 |
| 5,423,064 | 6/1995 | Sakata ........................ | 455/33.2 |
| 5,428,816 | 6/1995 | Barnett et al. ........................ | 455/33.2 |
| 5,440,613 | 8/1995 | Fuentes ........................ | 379/60 |
| 5,509,051 | 4/1996 | Barnett et al. ........................ | 379/59 |
| 5,519,697 | 5/1996 | Fujita et al. ........................ | 370/58.3 |
| 5,634,192 | 5/1997 | Meche et al. ........................ | 455/437 |
| 5,701,585 | 12/1997 | Kallin et al. ........................ | 455/437 |
| 5,710,973 | 1/1998 | Yamada et al. ........................ | 455/434 |
| 5,722,073 | 2/1998 | Wallstedt et al. ........................ | 455/438 |
| 5,794,149 | 8/1998 | Hoo ........................ | 455/436 |

FOREIGN PATENT DOCUMENTS

| | | |
|---|---|---|
| 0490509 | 6/1992 | European Pat. Off. . |
| 2277849 | 11/1994 | United Kingdom . |
| WO 96/10893 | 4/1996 | WIPO . |
| WO 96/19088 | 6/1996 | WIPO . |
| WO 97/06648 | 2/1997 | WIPO . |

OTHER PUBLICATIONS

PCT International Search Report, Dec. 18, 1998, PCT/SE 98/00852.

*Primary Examiner*—Edward F. Urban
*Assistant Examiner*—Thuan T. Nguyen
*Attorney, Agent, or Firm*—Jenkens & Gilchrist, P.C.

[57] ABSTRACT

A neighborhood zone covering an enclosed or surrounded environment, such as a man-made building or high-rise, is defined within a mobile telecommunications network by associating a plurality of base stations with respective cell areas. A same neighborhood list indicating all measurement channels being utilized within the neighborhood zone by said plurality of base stations is then further defined. The defined same neighborhood list is then transmitted by each of the base stations within its respective coverage area. A mobile station traveling within the neighborhood zone then scans and reports measurements from the indicated measurement channels to the serving mobile telecommunications network. The mobile telecommunications network then effectuates a handover in accordance with the received signal measurements. An idle mobile station further utilizes the measurements to effectuate a cell re-selection.

7 Claims, 6 Drawing Sheets

PROVIDING A NEIGHBORHOOD ZONE WITHIN A MOBILE TELECOMMUNICATIONS NETWORK

BACKGROUND OF THE INVENTION

1. Technical Field of the Invention

The present invention relates to a mobile telecommunications network and, in particular, to the association of a uniform neighborhood list with a plurality of cell areas within a particular service area.

2. Description of Related Art

Within a cellular telecommunications system, a plurality of base stations each providing radio coverage over a particular geographic area are interconnected to form a system offering continuous and contiguous radio coverage. However, since a number of available or allocated radio frequencies or channels are fixed, the available frequencies or channels are accordingly planned and reused within a particular service area. As an illustration, an architecture having cells and clusters of cells is utilized to repeatedly reuse the available frequencies to provide radio coverage over a particular service area and to reduce co-channel interference created therewith.

While engaged in a call connection, a mobile station traveling within a particular mobile telecommunications network frequently moves out of a coverage area of a first base station and moves into a new coverage area being served by a second base station. As a result, unless the call is correctly and accurately transferred (handover) from the first base station to the second base station, the existing call connection is undesirably interrupted. Furthermore, mistakenly utilizing a frequency associated with a non-optimum cell by a mobile station further increases the level of co-channel interference created for a resulting air interface. It may further require an additional handover to improve the speech connection.

One of the ways for effectively handing over a mobile station from a first cell area to a second cell area is known as a mobile-assisted-handover (MAHO). A mobile station continuously measures signal strength from neighboring or adjacent base stations, reports the measurements back to the serving mobile telecommunications network, and assists in the handover between two adjacent base stations. Therefore, in order to enable a mobile station traveling within a particular cell area to measure beacon, pilot, control, or measurement frequencies associated with neighboring cells, the serving base station needs to identify a list of frequencies to be measured by the mobile station. Such a list is referred to as a "neighbor list", which is then continuously sent to mobiles after a call has been established. The mobile station then measures the identified frequencies to assist in determining whether a handover, for example, from the current cell area to one of the identified adjacent cell areas is needed.

A similar measurement is also made by a mobile station in idle mode as the mobile station roams from a first cell area, for example, to a second cell area. Such a process for selecting a new cell is referred to as a cell re-selection process. In this case the neighbor cell list broadcast on the control channel of the serving base station is specifying which channels to measure on.

Figure 1:
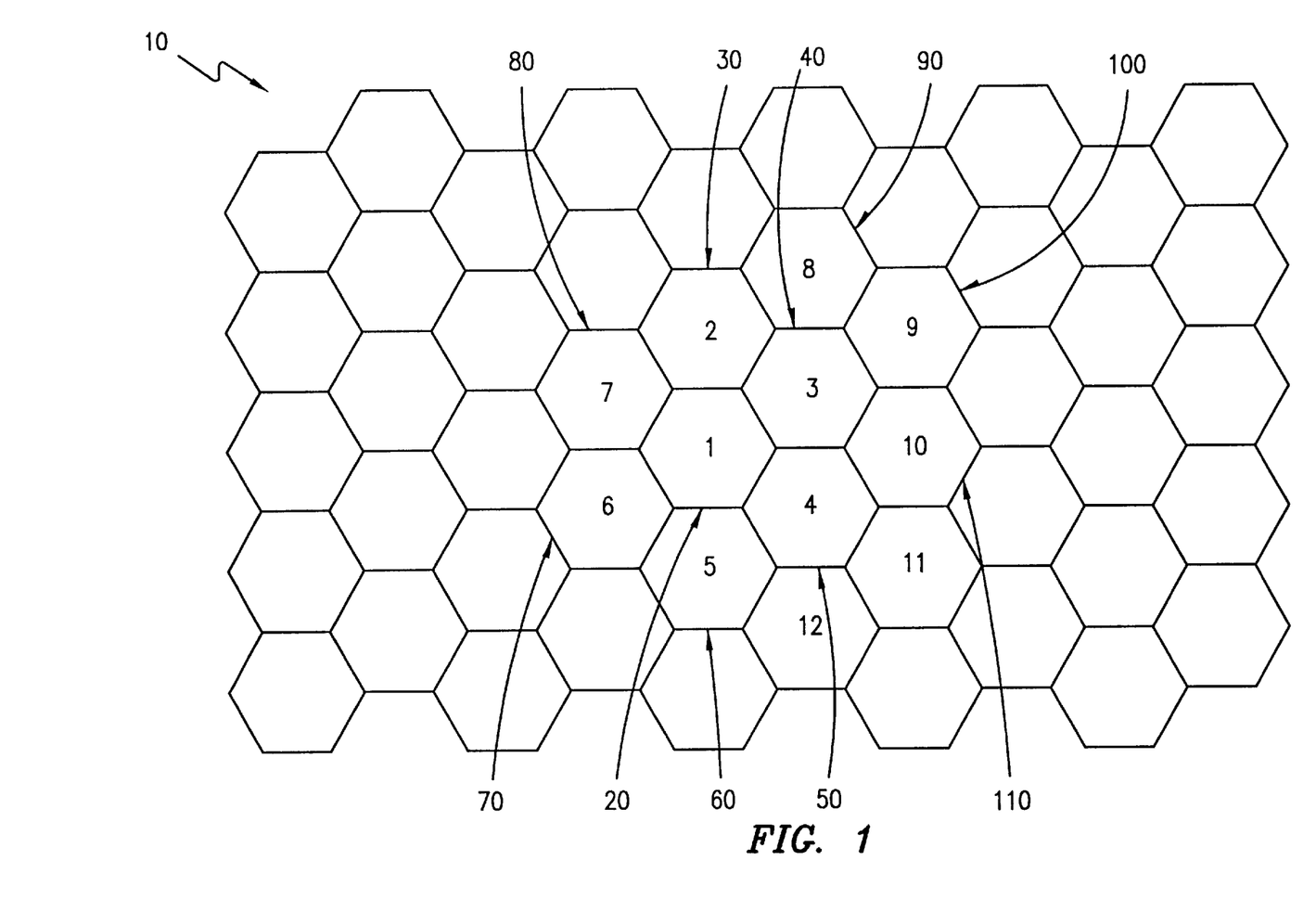
FIG. 1, as described above, is a pictorial diagram of a service area illustrating a plurality of cell areas each being served by a respective base station.

Reference is now made to FIG. 1 which is a pictorial diagram of a service area 10 illustrating a plurality of cell areas each being served by a respective base station. Each base station is further associated with a measurement channel for identifying its coverage area. Such measurement channels are also known as beacon, control, page, and pilot channels. For exemplary purposes, only one measurement channel is shown assigned to each cell area in FIG. 1. But it will be understood that a plurality of channels, including traffic channels, are typically assigned to a single base station serving a particular cell area.

In a conventional manner, when a mobile station is located within a cell area being served by measurement channel number one 20, a base station associated with that cell area transmits a neighbor list identifying frequencies to be monitored by the mobile station. As an illustration, while being served by channel number one in cell 20, the associated base station instructs the mobile station to monitor and to measure signal strength associated with a neighbor list including measurement channel numbers two, three, four, five, six, and seven in cells 30, 40, 50, 60, 70, and 80, respectively. The transmitted neighbor list therefore instructs the mobile station to measure signals received over the indicated measurement channels from all possible cell areas into which the mobile station may possibly travel. Such a neighbor list is independently defined for (i.e., unique to) each cell. Accordingly, when the mobile station travels out of the current cell area 20 associated with measurement channel number one and into an adjacent cell area 40 being served by measurement channel number three, a base station serving the new cell area similarly transmits a new neighbor list instructing the mobile station to monitor a new set of measurement channels in neighboring cells. For example, while traveling within the cell area 40 associated with channel number three, the mobile station is similarly instructed to measure a neighbor list including measurement channel numbers eight, nine, ten, four, one, and two in cells 90, 100, 110, 50, 20 and 30, respectively.

However, such an implementation for providing a cell area dependent neighbor list is inconvenient and inefficient. During cell planning, for example, an operator or planner has to tediously define a plurality of neighboring frequencies or channel numbers for each cell within a particular network. Such an association may further require manual signal measurements within each of the associated cells to identify and to define a neighbor list. Furthermore, creating such a neighbor list in a certain environment may even be impractical. Such an environment, for example, includes man-made buildings or high-rises.

Figure 2:
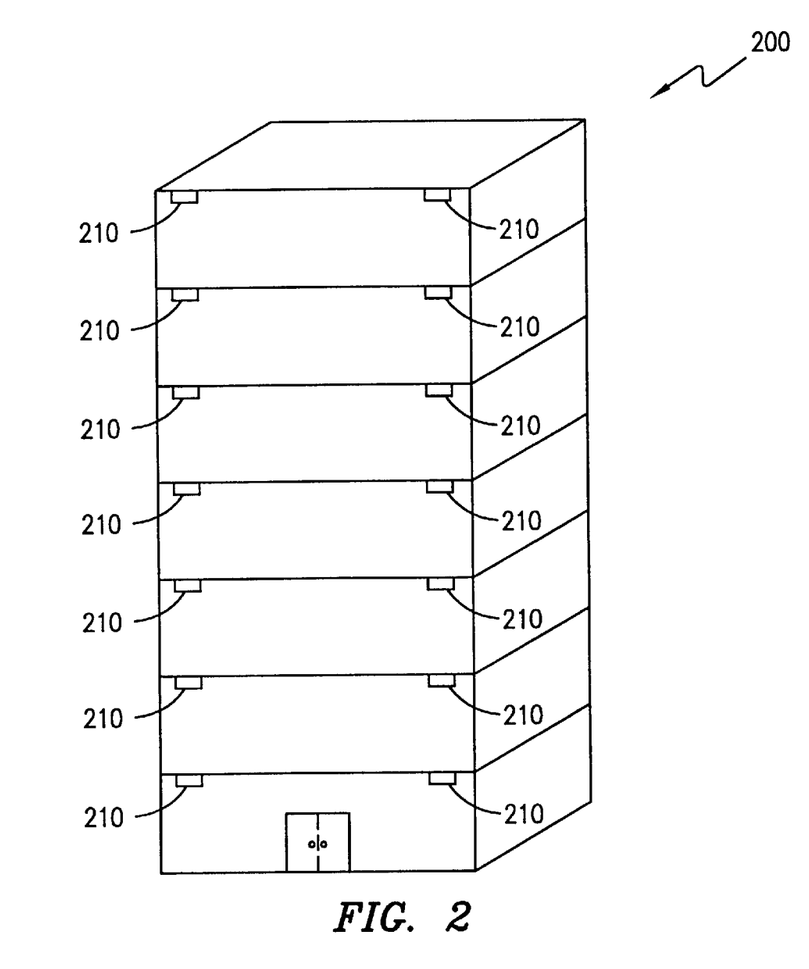
FIG. 2, as described above, is a pictorial diagram of a building being served by a plurality of base stations located internally therein.

In order to effectuate a radio interface even within an enclosed environment, such as a building or high-rise, the concept of pico cells or indoor cells has been introduced. Reference is now made to FIG. 2 illustrating a building 200 being served by a plurality of base stations 210 located internally therein. Accordingly, when a mobile station enters the building 200, the mobile station effectuates mobile service by communicating radio signals with base stations (BSs) 210 strategically placed throughout the structure. Within such a three-dimensional layout, defining a customized neighbor list for each base station becomes very tedious and inconvenient. Furthermore, as furniture and walls are moved and/or rearranged, an associated neighbor list specifying the optimum neighboring channels may change. Moreover, due to interferences and fading, a base station located not adjacent to the current location may unexpectedly provide better radio communication to a particular mobile station than the most adjacent base station. As a result, the best cell candidate may not even be included within the provided neighbor list. Accordingly, within such a topography, a manually defined neighbor list may not provide the best channel candidate during a cell selection process for a mobile station.

Accordingly, there is a need for a mechanism to enable a serving mobile telecommunications system to select a better cell candidate for a traveling mobile station.

SUMMARY OF THE INVENTION

A neighborhood zone is defined within a mobile telecommunications network to cover a particular geographic area or a building. The defined neighborhood zone comprises a plurality of cell areas, each cell area being served by a base station. Each base station is further associated with a measurement channel to be broadcast over its respective cell area. A same neighborhood list is then defined within said neighborhood zone wherein said neighborhood list includes data specifying all measurement channels associated with said plurality of base stations included within said neighborhood zone. The defined same neighborhood list is thereafter uniformly transmitted within each of said plurality of cell areas. For a busy mobile station, measurements are made for each of the indicated measurement channels and reported back to the serving telecommunications network to perform a mobile assisted handover (MAHO). For an idle mobile station, cell re-selection is made to change to a new neighborhood cell more suitable for providing mobile service to the roaming mobile station.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 3:
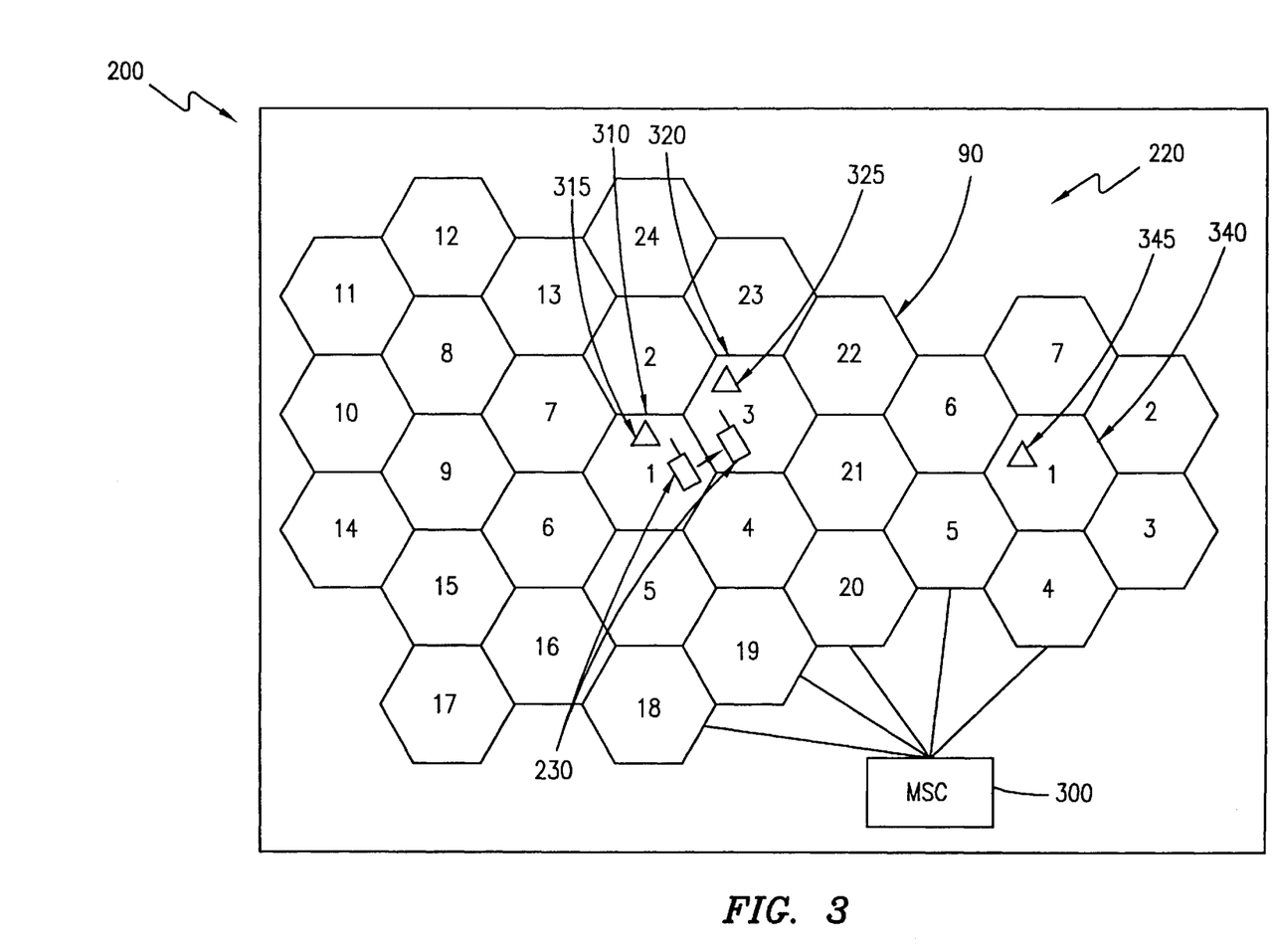
FIG. 3 is a block diagram of a neighborhood zone illustrating a plurality of cell areas each transmitting a uniform neighborhood list therein.

FIG. 3 is a block diagram of a neighborhood zone illustrating a plurality of cell areas each transmitting a uniform neighborhood list in accordance with the teachings of the present invention. A neighborhood zone 220 is planned in order to provide radio coverage over, for example, a building 200 as illustrated above in FIG. 2. It is in connection with this particular application that the preferred embodiments of the present invention will be described. However, as the system and method of the present invention are applicable to any mobile telecommunications network wherein a plurality of base stations are utilized to provide radio coverage over an enclosed or surrounded environment, such as an enclosed campus, high-rises, shopping malls, and the like, it will be understood that the description of the present invention in the context of a building provided herein is by way of explanation of the invention rather than of limitation of the scope of the invention.

Accordingly, a plurality of base stations each serving a respective cell area are connected to a mobile switching center (MSC) 300 to provide mobile service within the building 200. Each cell area associated with a base station is further assigned with a measurement channel in a conventional manner. Planning or allocating such measurement channels are performed in a conventional manner to reduce co-channel and adjacent channel interferences within the neighborhood zone 220. Instead of independently and individually determining and associating a neighbor list for each cell area, a single "neighborhood list" specifying all of the measurement channels being utilized within the neighborhood zone is defined. Thereafter, in accordance with the teachings of the present invention, regardless of which cell area is at issue, a corresponding base station transmits the neighborhood list to associated mobile stations within its cell area. As a result, unlike the conventional system, as a mobile station 230 moves out of a first cell area 310 associated with measurement channel number one into a second cell area 320 associated with measurement channel number three, a first base station (BS) 315 serving the first cell area 310 and a second base station (BS) 325 serving the second cell area 320 transmit the same neighborhood list. Similarly, all other base stations within the neighborhood zone transmit the same neighborhood list.

The number of measurement channels capable of being measured by a mobile station traveling within the neighborhood zone is mobile terminal dependent. For example, a digital advanced mobile phone service (D-AMPS) standard based mobile station is capable of scanning and measuring signal strength from up to twenty-four (24) channels. Accordingly, twenty-four measurement channel numbers can be reused and planned within the neighborhood zone 220.

For a mobile station in conversation, the mobile station 230 measures the signal strength, for example, from each of the measurement channels indicated by the neighborhood list and reports the measurements back to the serving base station. The method for measuring such measurement channels within a Time Division Multiple Access (TDMA) based telecommunications network, for example, is already well known to those skilled in the mobile telecommunications art and will not be discussed in detail herein. The fixed part of the mobile telecommunications network, such as base stations (BS 315, 325), base station controller (BSC) (not shown), and/or mobile switching center (MSC) 300 then evaluates these measurements to determine whether a handover is needed for the reported mobile station. As an illustration, when the measurement associated with the current cell area falls below a threshold level, for example, the serving MSC or base station controller (BSC, not shown in FIG. 3) effectuates a handover from the current cell to one of the neighbor cells with better measurements.

For an idle mobile station, another process known as a cell re-selection process is performed. As long as the mobile station remains within the same location area (LA)(not shown), there is no need for the mobile station to inform the serving mobile telecommunications network of its current location or associated cell area. Accordingly, in accordance with the teachings of the present invention, as long as the mobile station remains within the neighborhood zone, for example, the mobile station listens or "scans" the measurement channels provided within the broadcast neighborhood list and independently switches to one of the better adjacent cells.

Figure 4:
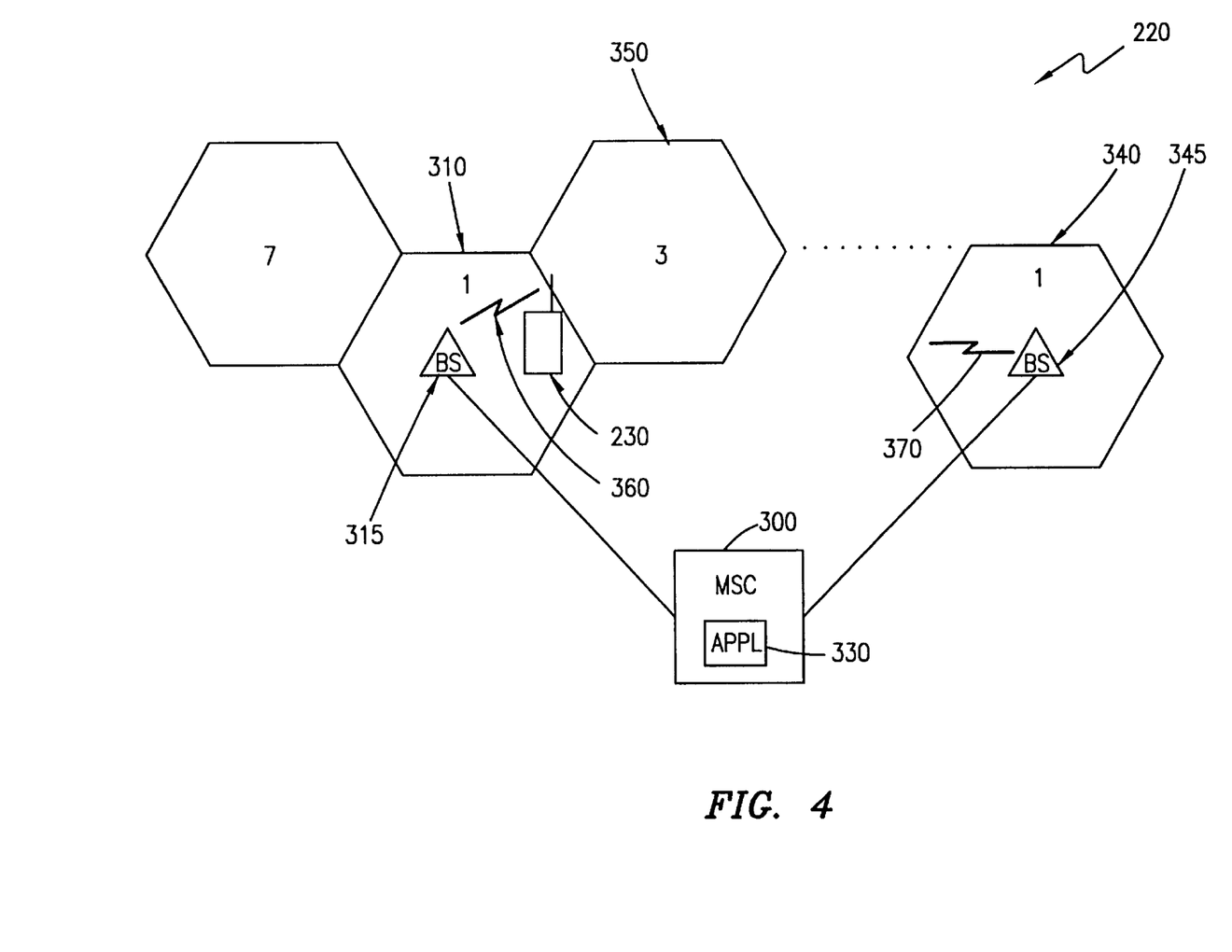
FIG. 4 is a block diagram of a neighborhood zone illustrating a mobile switching center (MSC) serving associated cell areas and selecting an appropriate cell from a plurality of cell areas utilizing the same measurement channel.

Reference is now made to FIG. 4 illustrating a mobile switching center (MSC) 300 selecting an appropriate cell area from a plurality of cell areas utilizing the same measurement channel for a particular mobile station 230. As described above, due to the limited number of measurement channels allocated for a particular mobile telecommunications network and the physical limitations imposed on a mobile station to scan for and to measure on such channels, the available measurement channels may need to be reused within the neighborhood zone 220. As an illustration, a first cell area 310 associated with a first base station 315 is utilizing measurement channel number one to transmit a neighborhood list. Another cell area 340 within the same neighborhood zone 220 is further utilizing measurement channel number one to broadcast the same neighborhood list. The two cells utilizing the same measurement channel number are sufficiently distanced apart (re-use distance) to ensure acceptable co-channel interference created from using the same frequency.

When the mobile station 230 in speech connection and currently traveling within a cell area 350 reports a measurement below a threshold value imposed on the mobile telecommunications network from the current cell area 350 and further reports a desirable measurement from measurement channel number two, an application module 330 associated with the serving mobile switching center (MSC) 300, for example, determines that the mobile station 230 needs to be handed over from the current cell area to one of the neighboring cells. The application module 330 then determines that the indicated measurement channel number is being reused by the two cell areas within the neighborhood zone. Since the reported measurement is the sum of two channel strengths received by the mobile station from the first and second base stations 315 and 345, in order to ascertain which one of the two cells is currently more suitable for serving the mobile station 230, the application module 330 instructs the first base station (BS) 315 serving the first cell area 310 and the second base station (BS) 345 serving the second cell area 340 to measure up-link communication quality for the traveling mobile station (also known as a mobile verification process) within their respective cell areas. The application module 330 then hands over the mobile station in conversation to the one of the base stations with better up-link communications quality. As a result, a new traffic channel (TCH) associated with the new base station is seized and the existing call connection is allowed to hand over to the new cell area in a manner well known to those skilled in the art.

Figure 5:
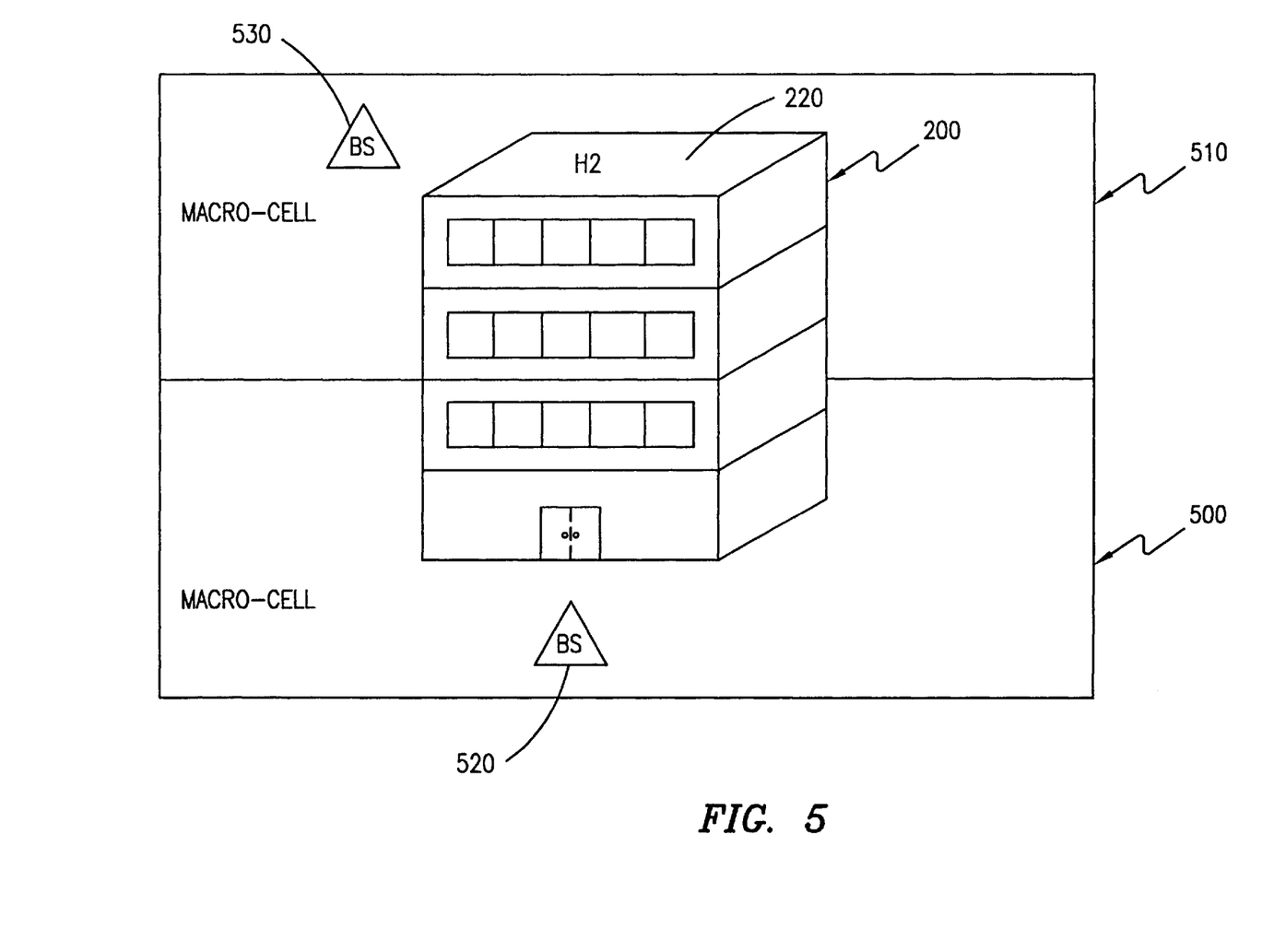
FIG. 5 is a pictorial diagram of a building associated with a particular neighborhood zone being served by a number of macro cells within a public land mobile network (PLMN)

FIG. 5 is a pictorial diagram of a building associated with a particular neighborhood zone being served by a number of macro cells within a public land mobile network (PLMN). In accordance with the teachings of the present invention, mobile service within the building 200 is effectuated via a number of base stations internally located and associated with each other as a neighborhood zone 220. Furthermore, in order to provide mobile service to a mobile station located external to the building 200, one or more macro or micro cells 500–510 are shown associated with a serving PLMN. As an illustration, when a mobile station (not shown) utilizing mobile service via a first base station 520 serving a first macro cell area 500 then travels into the building 200, one of the pico base stations associated with the neighborhood zone 220 then receives the mobile station and continuously provides mobile service thereto. A similar handover between a cell associated with the neighborhood zone and a serving PLMN is performed when a mobile station exits from the building into one of the macro cells 500–510. Accordingly, in order to effectuate such a handover between the neighborhood zone and the PLMN, the neighborhood list broadcast within the building includes all measurement channels associated with a plurality of cell areas within the neighborhood zone and one or more measurement channels associated with the surrounding or neighboring macro cells. For example, measurement channels assigned to the first base station 520 and a second base station 530 associated with the second macro cell 510 are included within the neighborhood list transmitted to the mobiles within the neighborhood zone 220.

Figure 6:
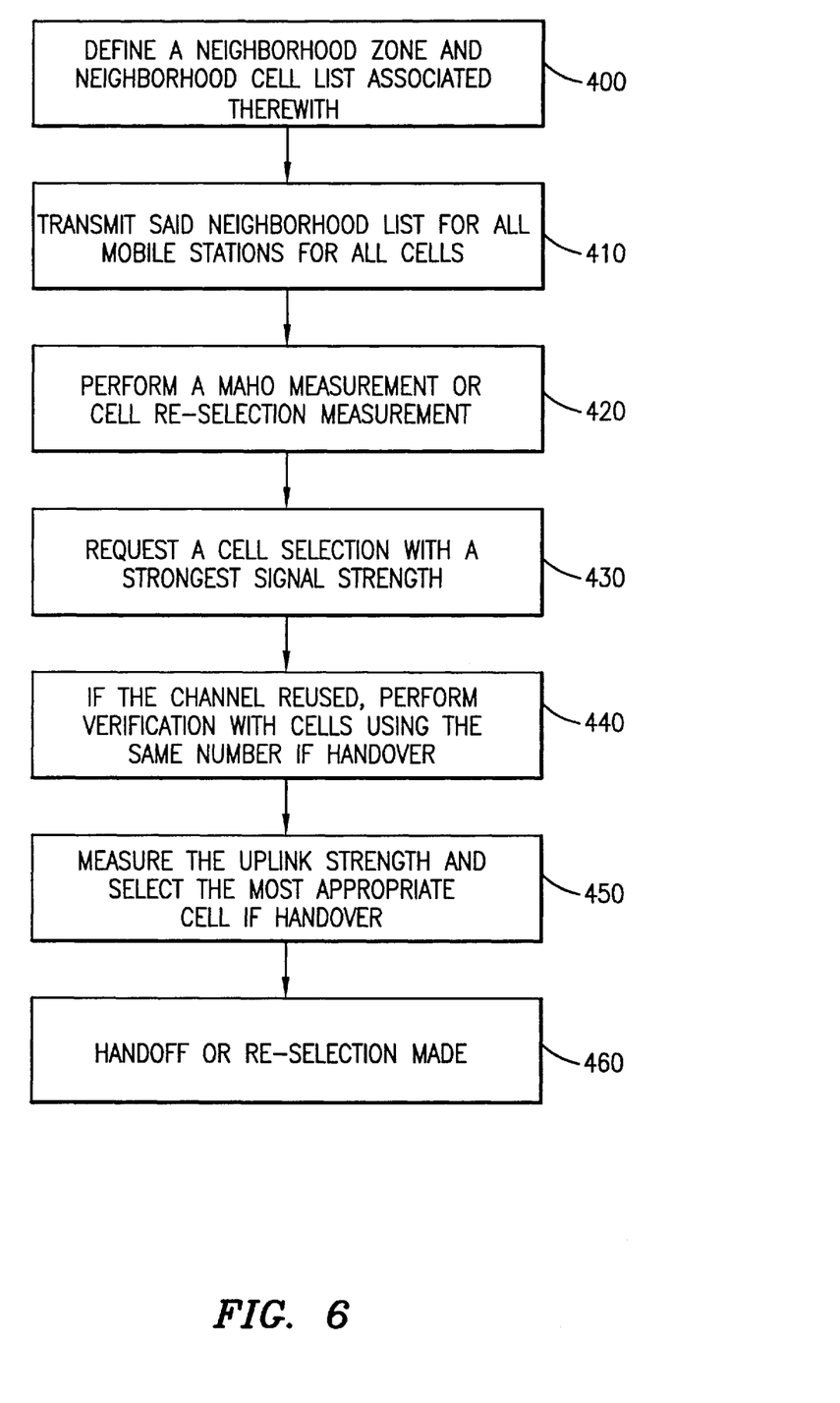
FIG. 6 is a flowchart illustrating the steps performed by a serving mobile telecommunications network and associated mobile stations in accordance with the teachings of the present invention.

Reference is now made to FIG. 6 which is a flowchart illustrating the steps performed by a serving mobile telecommunications network and an associated mobile station in accordance with the teachings of the present invention. A neighborhood zone is defined to provide radio coverage over a particular area at step 400. Such an area could include an enclosed or surrounded environment, such as a building, in which a mobile subscriber has limited exit and entry points and wherein access to outside macro or micro base stations are interfered or barred by surrounding walls and/or structures. Available measurement or control channels allocated for the mobile telecommunications network are planned and reused by a plurality of base stations providing contiguous and continuous radio coverage over the associated geographic area. A single neighborhood list specifying the measurement channels being utilized by all of the base stations within the neighborhood zone is further defined. Such a list may further include additional measurement channels associated with, for example, base stations covering exit and entry points, and macro and/or micro cells covering the geographic area surrounding the building.

Each base station associated with the neighborhood zone transmits the defined neighborhood list within its respective cell area at step 410. Therefore, unlike the conventional manner as described in FIG. 1, all base stations instruct associated mobile stations to monitor and measure the same list of measurement channels. For a mobile station in conversation traveling from a first cell area to a second cell area, MAHO measurements on the indicated measurement channels are made by the traveling mobile station and reported back to the serving base station at step 420. The serving mobile switching center (MSC), for example, then instructs a base station with the strongest reported measurement to accept the handover and to allocate a new traffic channel for the mobile station at step 430. For an idle mobile station, similar measurements are made by the mobile station to select a new cell to roam into from the current cell area.

Where the measurement channel reported with the highest measurement from a mobile station in speech is being reused within the neighborhood zone, the serving MSC instructs associated base stations utilizing the indicated measurement channel to perform mobile station verification at step 440. Accordingly, up-link communication quality is measured by each of the associated base stations to determine which base station has the highest connection quality at step 450. Such quality includes signal strength, bit or frame errors, time dispersion factors, etc. The mobile station is then instructed to handover to the determined base station at step 460. For a mobile station in idle mode, a cell re-selection is independently made by the roaming mobile station at step 460.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and changes without departing from the scope of the invention as set forth and defined by the claims.

What is claimed is:

1. A method for providing a neighborhood list within a neighborhood zone, said neighborhood zone covering a portion of a geographic area within a mobile telecommunications network and comprising a plurality of cell areas, each of said cell areas being served by a base station and associated with a measurement channel for identifying said base station, said method comprising the steps of:

associating a same neighborhood list for each of said base stations, said same neighborhood list containing all of said measurement channels associated with said plurality of cell areas within said neighborhood zone; and transmitting said same neighborhood list within each of said plurality of cell areas, said same neighborhood list instructing mobile stations traveling within each of said plurality of cell areas to measure said indicated measurement channels for mobile service.

2. The method of claim 1 wherein each of said base station, and said base stations are served by a single mobile switching center (MSC).

3. A method for performing handover between a first base station to a second base station within a neighborhood zone covering a portion of a geographic area within a mobile telecommunications network, said neighborhood zone associated with a plurality of base stations, each of said base stations serving an associated cell area and assigned with a measurement channel for identifying its cell area, said method comprising the steps of:

transmitting a same neighborhood list by each of said plurality of base stations to associated mobile stations traveling within its cell area, said transmitted same neighborhood list including said measurement channels assigned to each of said plurality of base stations;

receiving measurements transmitted by a busy mobile station traveling within a particular cell area;

determining that said busy mobile station needs to be handed over to another cell area;

determining that a measurement channel with a sufficient reported measurement is being reused within said neighborhood zone;

instructing plural base stations utilizing said determined measurement channel to evaluate up-link communications quality from said busy mobile station; and handing over said busy mobile station to a base station with better up-link communications quality.

4. A method for instructing a mobile station traveling within a neighborhood zone of a mobile telecommunications network to measure cell signals, said neighborhood zone covering a portion of a geographic area within a mobile telecommunications network and comprising a plurality of cell areas each being served by a base station and assigned with a measurement channel, said method comprising the steps of:

associating a same neighborhood list with each of said base stations, said same neighborhood list including measurement channels associated with all of said base stations within the neighborhood zone; and transmitting said same neighborhood list within said neighborhood zone by each of said plurality of base stations.

5. The method of claim 4, wherein at least one of said measurement channels is being reused within more than one cell area, further comprising the steps of:

receiving measurements associated with each of said transmitted measurement channels from a particular mobile station traveling within a cell area;

determining that said mobile station needs to be handed over to a cell utilizing a particular measurement channel with the strongest signal quality, wherein said particular measurement channel is being reused within said neighborhood zone; and handing over said mobile station to a base station with the highest up-link communications quality from said mobile station within said neighborhood zone.

6. A method for providing a neighborhood list towards a traveling mobile station within a neighborhood zone covering a portion of a geographic area, said neighborhood zone served by a first mobile telecommunications network including a plurality of first base stations for providing radio service therein and geographic area served by a second mobile telecommunications network including a plurality of second base stations for providing radio service therewith, said first and second base stations each having a measurement channel, said method comprising the steps of:

associating a same neighborhood list with each of said first base stations within the neighborhood zone, said same neighborhood list containing measurement channels associated with each of said plurality of said first base stations and at least one of said second base stations; and transmitting said same neighborhood list by each of said plurality of first base stations within the neighborhood zone, said same neighborhood list instructing mobile stations traveling within each of said plurality of first base stations to measure said indicated measurement channels for mobile service.

7. The method of claim 6 wherein said at least one of said second base stations included within said same neighborhood list provides radio coverage over entry and exit points associated with said enclosed area.

* * * * *